United States Patent

Tate

[15] 3,670,314

[45] June 13, 1972

[54] READ GATING CIRCUIT FOR CORE SENSING

[72] Inventor: Lawrence A. Tate, Poughkeepsie, N.Y.

[73] Assignee: International Business Machines Corporation, New York, N.Y.

[22] Filed: June 14, 1960

[21] Appl. No.: 35,994

[52] U.S. Cl. .............340/174 RC, 340/174 M, 340/174 DC, 340/174 WA

[51] Int. Cl. .......................................G11c 5/08, G11c 11/06

[58] Field of Search ...........................340/174 C, 166 C, 174

[56] References Cited

UNITED STATES PATENTS

| | | | |
|---|---|---|---|
| 2,691,156 | 10/1954 | Saltz | 340/166 C |
| 2,889,540 | 6/1959 | Bauer | 340/166 C |
| 2,904,781 | 9/1959 | Katz | 340/174 |
| 2,947,977 | 8/1960 | Bloch | 340/166 C |
| 3,003,139 | 10/1961 | Perkins | 340/174 |

*Primary Examiner*—James W. Moffitt
*Attorney*—John Clark, Roger S. Smith and John R. Shipman

[57] ABSTRACT

An information storage matrix, such as an array of magnetic cores, is provided with a separate reference storage device which is driven by the same read-out driver as the array. The reference read-out signal and the information signals are sensed and applied to a gating means, such as an AND gate, which operates only on the coincidence of the reference and information signals, thereby eliminating stray noise in the output.

32 Claims, 2 Drawing Figures

INVENTOR
LAWRENCE A. TATE
BY
Geoffrey Knight
ATTORNEY

READ GATING CIRCUIT FOR CORE SENSING

This invention relates to read-out circuitry for magnetic core matrices and more particularly to a circuit for eliminating stray noise in the output from such matrices.

A typical magnetic core matrix circuit utilizes two sets of drive lines, one line from each set passing through each core in such a direction that the magnetic effect of like polarity currents flowing in each of the lines is additive. Information is read into a core of the matrix by applying currents of like polarity to each of the core's two drive lines to switch the core, a current on only one of its drive lines having an insufficient magnetic effect to switch the core. The information is then read out of the core by applying currents of the opposite polarity to each of the core's two drive lines, again a current on only one of the core's drive lines being insufficient to switch it. A single sense line passes through all of the cores of the matrix and has a voltage induced in it by the change in magnetic flux which occurs when one of the cores is switched. In practice, the only signal on the sense line which is of interest is that which is caused by the switching of a core on read-out.

Diodes or gates may be used in a conventional manner to eliminate the signal which occurs on the sense line when a core is switched on read-in. There is, however, a real problem in separating the desired read-out signal from the stray noise which occurs during read-out operation. This noise arises from a number of sources, one principal source being the voltages induced in the sense line by the small changes in flux which occur in all the cores of the matrix having a current appearing on only one of their drive lines.

A number of systems are presently being employed to distinguish between the output signal and noise in the sense line of a magnetic core matrix. Perhaps the most common method is to use a machine clock pulse to trigger the appropriate matrix drivers to read out a selected core and then to apply either a delayed version of the same clock pulse or a second machine clock pulse to gate means in the sense line. In theory, the clock pulse would be applied to the gate means at a time in the cycle when the read-out signal on the sense line is reaching its peak and would last for the duration of the signal on the sense line. However, variations in circuit parameters make it impossible for this circuit to always operate according to theory. Even though the clock pulse is applied to all the drivers at the same time, variations, such as those in the response time and in the gain of individual drivers, will cause the output signal on the sense line to occur at slightly different times in different cycles. The number of cores which a driver will attempt to switch will vary with the information in the matrix. This will cause variations in the output wave forms by varying the load on a given driver for each triggering. Further variations in the drive signal will be caused by changes in environmental conditions and by deterioration of components with time. A problem therefore arises in that if the time of operation for the sense line gate means is made long enough to allow the information signal to get through no matter what the delay in the drivers, there is a possibility of noise also getting through; while, if the time of operation of the gate means is made short enough to prevent any noise from getting through, there is a possibility that part of the information signal will also be chopped off.

Other systems for differentiating between signal and noise in the sense line of a magnetic core matrix have depended on the signal having a greater amplitude than the noise or a longer duration; but experience has shown that the noise signal is on occasions equal to or even greater than the signal amplitude and that there is likewise no significant difference in their durations.

It is therefore an object of this invention to provide a circuit which will supply a pulse to the sense line gate means at the proper time in a cycle regardless of delays in the occurrence of the drive pulses.

Another object of this invention is to provide a circuit which will block the output from the sense line for the maximum amount of time without losing any information.

In accordance with the principle of the invention these objects are achieved by a circuit which utilizes at least one of the matrix read-out drive signals to condition the sense line gate means.

This circuit generally provides means for delaying and limiting the output from at least one of the sets of core drive means and applying this modified signal to condition a gate in sense line. A preferred embodiment of this invention utilizes a bistable element such as a magnetic core which is adapted to be switched to one of its stable states by the coincident occurrence of pulses on each of the two sets of drive lines. The switching of this element causes what shall hereinafter be referred to as the sample pulse. This sample pulse is applied as one of the inputs to a coincidence gate circuit, the other input to this gate being the output of the sense line. The coincidence gate will therefore be conditioned when a pulse actually occurs on the drive line and need remain conditioned for only the duration of the information signal. Means are provided to reset the bistable element before the next read-out pulse occurs.

The foregoing and other objects, features and advantages of the invention will be apparent from the following more particular description of preferred embodiments of the invention, as illustrated in the accompanying drawings.

Figure 1:
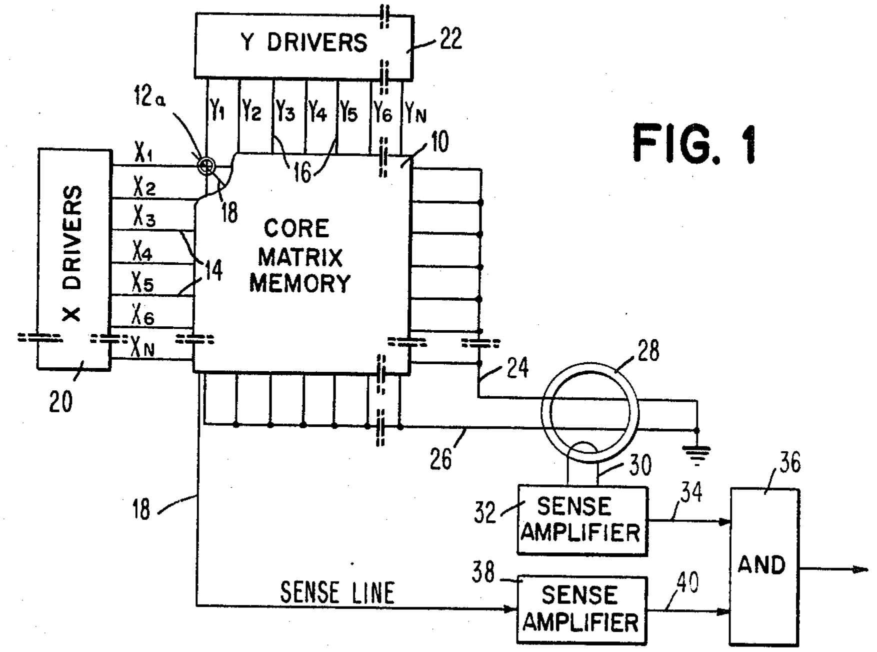
FIG. 1 is a schematic representation of a preferred embodiment of this invention.

The preferred embodiment of this invention shown, by way of example, in FIG. 1 comprises a matrix memory array 10 of magnetic cores 12. Each core of this array has an X drive line 14, a Y drive line 16, and the sense line 18 passing through it. X drivers 20 and Y drivers 22 are provided for respectively pulsing the individual X and Y drive lines. These drivers may include a plurality of separate pulse generators or they may be a switching network such as the well known coincident or anticoincident current matrix switch or load sharing switches such as are shown in copending application Ser. No. 745,395 filed by G. Constantine June 30, 1958 and now U.S. Pat. No. 3,126,528. A single sense line 18 passes through all of the cores 12 of the matrix array 10. All of the X drive lines 14 are connected to ground through the common line 24 and all of the Y drive lines 16 are similarly connected to ground through the common line 26. Both the common line 24 and the common line 26 pass through a magnetic core 28 before passing to ground, the sense of these lines as they pass through the core 28 being such that their magnetic effects are additive.

A winding 30 on the core 28 sends a pulse to the sense amplifier 32 when the core 28 switches. The sense amplifier 32 is connected by the line 34 to serve as one of the inputs to the AND gate 36. The other input to the AND gate 36 comes from the sense line 18 through the sense amplifier 38 and the line 40.

Assume that information has already been read into the matrix array 10 and that the circuit is now in the read-out portion of the cycle. Then, when one of the cores 12, for example the core **12*a* shown in the figure at the junction of drive lines $X_1$ and $Y_1$, is switched by the coincident occurrence of drive pulses on both its X and Y drive lines, the change in the magnetic flux of the core 12*a* induces a current pulse in sense line 18. This pulse is the information signal which is to be differentiated from noise signals induced on the sense line 18 mainly by the small changes in flux in the cores other than 12*a* which the drive lines $X_1$ and $Y_1$ pass through. Both the information signal and the noise are amplified by sense amplifier 38 and applied by line 40 to one terminal of AND gate 36**.

At the same time that the drive pulses on the lines $X_1$ and $Y_1$ are switching the core **12*a*, these same pulses are also passing through the lines 24 and 26 respectively to ground. The coincident occurrence of pulses on lines 24 and 26 switches the magnetic core 28. The resulting output on line 30, the sample pulse, is amplified by sense amplifier 32 and applied through line 34 to the AND gate 36**, the AND gate being conditioned for the duration of this sample pulse.

It can be seen that with this circuit the same drive pulses are applied to switch both a matrix core 12 and the sampling core 28. The information pulse out of a core 12 and the sample pulse out of core 28 are both passed through the same circuitry and therefore, since they both are initiated at the same time, these two pulses appear simultaneously at the inputs to the AND gate 36. Likewise, since these two pulses originate in the same manner, the cores from which they are derived having substantially the same characteristics, their durations will be essentially identical. Therefore, the circuit of FIG. 1 allows the AND gate 36 to block the output from the sense line for the maximum amount of time, the AND gate 36 being open only for the exact duration of time that the information signal is passing through.

The core 28 cannot, of course, supply another sample pulse until it is reset. It is customary, however, to read back into a core matrix after it has been read out. On read-in, the sense of the pulses supplied by the X drivers 20 and the Y drivers 22 is opposite to that on read-out and the coincident occurrence of pulses of this reverse polarity on the lines 24 and 26 will reset the core 28 to its original state. This switching of the core 28 will also cause an unwanted pulse on the line 30 which could be blocked by a diode (not shown). However, a diode is not generally required since the polarity of this pulse usually is such as to further cut off rather than to condition the gate 36.

The circuit of FIG. 1 might be easily modified by substituting any suitable bistable circuit for the core 28, a suitable bistable circuit being one with a switching time approximately equal to that of a matrix core 12. For example, the lines 24 and 26 might be applied as the triggering inputs to a single shot multivibrator, the delay time of the multivibrator in its semistable condition being equal to the duration of the information signal. If the switching time of the bistable circuit were longer or shorter than that of a matrix core 12, a delay line might be placed in either the sense line 18 or in the line 34, thereby allowing the information signal and the sample pulse to appear simultaneously at the inputs to the AND gate 36.

Figure 2:
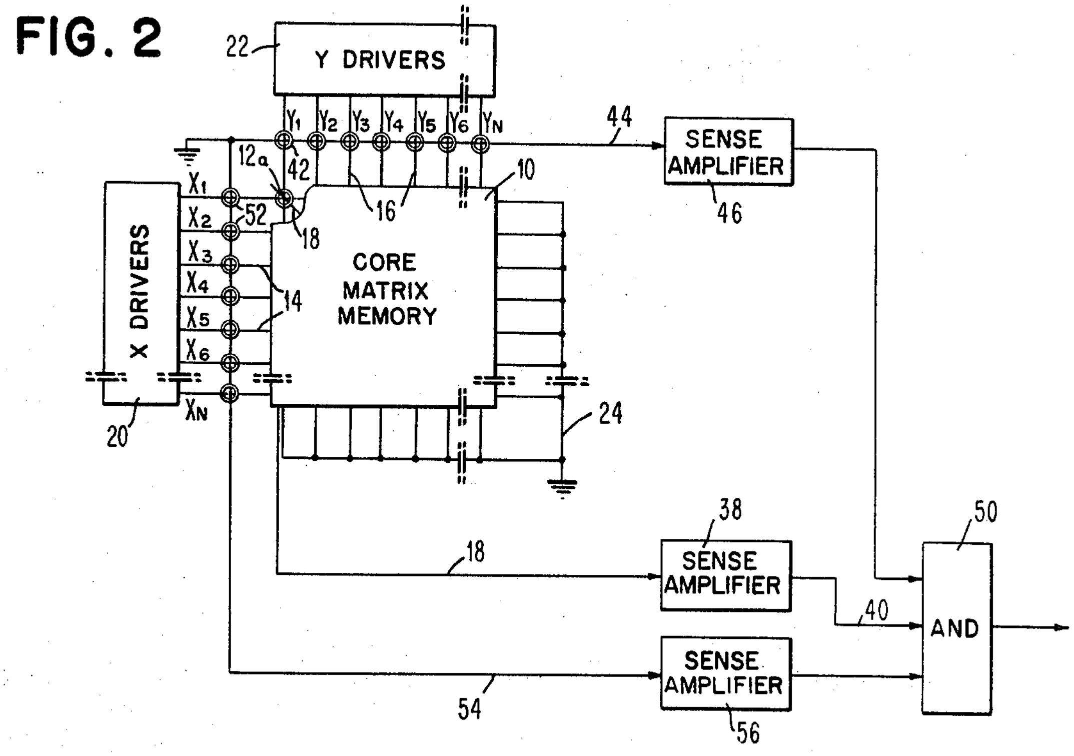
FIG. 2 is a schematic representation of another embodiment of this invention.

Another alternative embodiment of this invention is shown in FIG. 2. Looking only at the Y side of that circuit, each drive line 16 is passed through a magnetic core 42, there being a separate core 42 for each drive line 16. A single sample line 44 passes through all the cores 42. A pulse on the sample line 44 is amplified by a sense amplifier 46 and applied as a conditioning input to the AND gate 50. A core 42 is reset when a read-in pulse appears on its associated drive line 16. The pulse which this switching of a core 42 causes on line 44 may be blocked by a diode (not shown), but a diode is often not required for reasons already mentioned. When a read-out pulse appears on a drive line 16, the associated core 42 is switched inducing a sampling pulse on line 44 to condition the gate 50. A second sampling pulse may be similarly derived from the cores 52 in the X drive lines 14 through the sample line 54 and sense amplifier 56.

In the description so far, a magnetic core has been used to both delay and limit the output from the drive means which is to be applied as the sample pulse to the AND gate. It is, however, within the contemplation of this invention to use any suitable delay and limiting means, whether this means be a single element or a combination of elements.

It is also within the contemplation of this invention to use the outputs from only one of the sets of drivers to perform the conditioning function. However, if this procedure is followed, any delay in the set of drivers not supplying the conditioning pulse will go uncompensated for. Therefore, if the sample pulse is to be derived from only one of the drivers, it would be preferrable to employ a "staggered read." With a staggered read, the drive means not supplying the sample pulse would be triggered first. After a period of time sufficient for the half-select noise caused by the triggering of the first drive means to subside, the other drive means would be triggered to switch the matrix core 12. The triggering duration for the first drive means would be longer than that for the second so that both drive pulses would terminate at approximately the same time. With this arrangement, the first drive means would always be on when the second drive means was triggered and it would therefore be necessary to compensate only for delays in the second drive means.

While the invention has been particularly shown and described with reference to preferred embodiments thereof, it will be understood by those skilled in the art that the foregoing and other changes in form and details may be made therein without departing from the spirit and scope of the invention.

I claim:

1. For a signal transfer device having a plurality of first magnetic core signal transfer elements having a substantially rectangular hysteresis characteristic, an output control circuit which comprises: at least one second magnetic core having the same operating characteristics and substantially the same electrical and thermal sensitivities as said first elements; a common read and write current switching source connected to said first and said second cores; means for deriving an output control pulse from flux reversal of said at least one second core; and, a signal output circuit connected to said signal transfer elements, said output circuit including an AND gate operated in response to said output control pulse for gating signals from said first transfer elements.

2. For a matrix of signal transfer elements having an input drive circuit and an output sense circuit, means for controlling said output comprising: at least one control device having substantially the same operating chracteristics and electrical and thermal sensitivities as said transfer elements; means for driving said device by said driving circuit in common with said signal elements to produce an output control pulse; and an output control circuit including an AND gate operated in response to said output control pulse wherein said at least one device is connected to said AND gate in driven relationship to said drive circuit and in gating relationship to said output circuit.

3. In an electronic data processing system: a plurality of signal data transfer elements having given characteristic sensitivities and response to switching pulses; driving circuit means for effecting said signal data transfer; signal detection means responsive to said transfer; and, means for controlling said signal detection which comprises a control circuit, including an AND gate and at least one control device having substantially the same operating and response characteristics as said transfer elements and directly operable by said same driving circuit means to produce an output control pulse, said at least one device being connected to said AND gate in gating relationship to said signal detections means, said AND gate being operated in response to said output control pulse for gating signals from said transfer elements.

4. A magnetic core memory system which comprises: a plurality of magnetic core memory elements having a substantially rectangular hysteresis characteristic; drive windings and sense windings linking said elements; means for applying flux reversing read pulses of one polarity to said drive windings; means for applying write pulses of opposite polarity to said drive windings; signal detecting means connected to said sense windings; a magnetic core memory device having operating characteristics and electrical sensitivities substantially identical to said memory elements connected in common to all of said drive windings; and a control pulse-providing circuit including an AND gate connected in gating relationship to said signal detecting means, said control pulse providing circuit being arranged to provide a pulse in response to read-pulse-produced flux reversal signals from said core device.

5. For a magnetic core memory system: a plurality of magnetic core memory elements having a substantially rectangular hysteresis characteristic; drive windings and sense windings linking said elements; means for applying driving pulses of one polarity to said cores to set their flux in one direction to store information; means for applying driving pulses of opposite polarity to said cores to reverse their flux and thereby induce signals in said sense windings to read out information; means for detecting signals in said sense windings; means for controlling said detection comprising a magnetic core memory device having substantially the same electrical sensitivities as said core elements and driven directly by said drive windings; control pulse producing means including an AND gate connected to said magnetic core memory device; and, means responsive to flux reversal of said magnetic core memory device for gating the output of said pulse producing means.

6. An electronic data processing memory system which comprises: a plurality of first magnetic memory cores having a substantially rectangular hysteresis characteristic; a plurality of drive windings linking said cores; drive pulse producing circuit means connected to said drive windings; a sense winding linking said cores; signal detection means connected to said sense winding; a signal output device; gating means including an AND gate connecting said signal detection means to said output device; a control circuit in control connection to said gating means; and, pulse producing means including at least one second magnetic memory core having substantially the same electrical sensitivities as said first cores and linked by drive windings connected to said drive pulse producing circuit and connected to said control circuit to produce an output control pulse, said gating means operated in response to said control pulse.

7. An electronic data processing memory system which comprises: a plurality of first magnetic memory cores each having a substantially rectangular hysteresis characteristic; a plurality of drive pulse conductors separately linking separate groups of said cores; drive pulse producing circuit means connected to said drive conductors, a sense winding linking said cores; signal detection means connected to said sense winding; a signal output device; gating means including an AND gate connecting said signal detection means to said output device; a control circuit in control connection to said gating means; and, pulse producing means, including at least one second magnetic memory core having substantially the same operating chracteristics and electrical sensitivities as said first memory cores and linked by drive conductors from said drive pulse producing circuit means, connected to said control circuit to produce an output control pulse, said gating means operated in response to said control pulse.

8. An electronic data processing memory system which comprises; a plurality of first ferrite cores each having a substantially rectangular hysteresis characteristic; a plurality of drive pulse conductors separately linking separate groups of said cores; a source of drive pulses connected to said drive conductors; a sense winding linking said cores; signal detection means connected to said sense winding; a signal output device; gating means including an AND gate connecting said signal detection means to said output device; a control circuit in control connection to said gating means; and, a source of pulses including a plurality of second ferrite cores each having substantially the same operating characteristics and electrical sensitivities as said previously mentioned cores and each linked by a conductor comprising a continuation of a separate plurality of said drive conductors, and one or more sense windings linking said second mentioned cores and connected to said control circuit to produce an output control pulse, said gating means operated in response to said control pulse for gating signals from said first ferrite cores.

9. In electronic data processing equipment a memory system which comprises: a plurality of first magnetic elements each having a substantially rectangular hysteresis curve characteristic and substantially identical electrical and thermal sensitivity; at least one second magnetic element having substantially the same hysteresis characteristic and electrical and thermal sensitivity as said first magnetic elements; common driving circuit means arranged to apply read and write current pulses to said first magnetic elements and said same read and write pulses to said at least one second element; means for deriving first output signals from said first magnetic elements in response to said read current pulses; means for deriving second output signals from said second magnetic element or elements in response to said same read current pulses; signal response means actuated by said first output signals; and means including an AND gate connected to said means for deriving first signals and said means for deriving second signals for gating said actuation of said response means with said second output signals.

10. In electronic data processing equipment a memory system which comprises: a plurality of first magnetic elements each having a substantially rectangular hysteresis curve characteristic and substantially identical electrical and thermal sensitivity, said first elements being arranged in X- and Y-coordinate rows and columns to form one or more memory planes;

at least one second magnetic element having substantially the same hysteresis characteristic and electrical and thermal sensitivity as said first magnetic elements; common driving circuit means arranged to apply read and write current pulses to said first magnetic elements and said same read and write pulses to said at least one second element; said common driving circuit including a plurality of X and Y conductors corresponding to individual ones of said rows and columns and linking the magnetic elements thereof and one or more conductors connected directly in series with said X and Y conductors and linking said second magnetic element or elements;

means for deriving first output signals from said first magnetic elements in response to said read current pulses comprising a sense amplifier corresponding to each of said memory planes and a sense conductor linking all of the magnetic elements of each plane and connected to its corresponding sense amplifier;

means for deriving second output signals from said second at least one magnetic element in response to said same read current pulses comprising a pulse amplifier and a sense conductor linking said second at least one magnetic element and connected to said amplifier;

signal response means actuated by said first output signals;

gating means comprising an AND gate having a first input connected to said means for deriving first output signals and a second input connected to said means for deriving second output signals; and means for causing signals arriving at said second input to follow in time corresponding signals arriving at said first input.

11. Electronic data processing apparatus comprising: a plurality of first magnetic devices all having at least two stable conditions of remanent magnetic flux and substantially the same electrical, magnetic and thermal sensitivities; means for selectively switching individual ones of said devices between said stable conditions for data processing purposes; means for deriving a signal response to said switching, said response having a time duration which includes a "noise signal" period and a "data signal" period; at least one second magnetic device, having substantially the same stable conditions of remanent flux and the same electrical, magnetic and thermal sensitivities as said first devices; means for switching said at least one second device simultaneously with selected ones of said first plurality of devices; means for deriving a similar signal response to said simultaneous switching of said second device; a signal output device connected to said means for deriving a signal response from said first devices; and, means including an AND gate connected to said means for deriving a response of said second device, responsive to the "data signal" period of said response of said at least one second device, for gating the transmission of the signal response of said first devices to said output device.

12. The invention according to claim 11 wherein said at least one second device is exposed to substantially the same signal-response-controlling electrical and thermal experience as said selected first devices.

13. The invention according to claim 12 wherein said "data signal" periods are variable with electrical and thermal parameters and signal sensing means is provided for determining the "data signal" period of said at least one second device.

14. The invention according to claim 13 wherein an AND gate input is provided to said signal output device, said AND gate having a first input connected to said means for deriving a signal response from switching of said selected first devices and a second input connected to said means for determining the "data signal" period of said at least one second device.

15. In electronic data processing equipment a memory system which comprises: a plurality of first magnetic elements each having a substantially rectangular hysteresis curve characteristic and substantially identical electrical and thermal sensitivity; at least one second magnetic element having substantially the same hysteresis characteristic and electrical and thermal sensitivity as said first magnetic elements; common driving circuit means arranged to apply read and write current pulses to said first magnetic elements and said same read and write pulses to said at least one second element; means for deriving first output signals from said first magnetic elements in response to said read current pulses; means for deriving second output signals from said second magnetic element or elements in response to said same read current pulses; signal response means actuated by said first output signals; and gating means comprising an AND gate having a first input connected to said means for deriving first output signals and a second input connected to said means for deriving second output signals.

16. In electronic data processing equipment a memory system which comprises: a plurality of first magnetic elements each having a substantially rectangular hysteresis curve characteristic and substantially identical electrical and thermal sensitivity; at least one second magnetic element having substantially the same hysteresis characteristic and electrical and thermal sensitivity as said first magnetic elements; common driving circuit means arranged to apply read and write current pulses to said first magnetic elements and said same read and write pulses to said at least one second element; means for deriving first output signals from said first magnetic elements in response to said read current pulses; means for deriving second output signals from said second magnetic element or elements in response to said same read current pulses; signal response means actuated by said first output signals; and means for gating said actuation of said response means with said second output signals, said gating means comprising an AND gate having a first input terminal connected to said means for deriving first output signals and a second input terminal connected to said means for deriving second output signals.

17. A magnetic memory matrix comprising information word storage means comprising a plurality of magnetic means for storing a plurality of information bits and a reference bit in the form of a particular remanent flux state, a plurality of sensing conductor means associated with the magnetic means of said word storage means, means for simultaneously switching particular remanent flux states in said word storage means to generate an information read-out signal and a reference read-out signal on said sensing conductor means, means responsive to said reference read-out signal for producing a strobe signal, and means responsive to said strobe signal for strobing said information read-out signal.

18. An information storage matrix comprising a plurality of information storage devices, a reference storage device, an information sensing conductor associated with said information storage devices, a reference sensing conductor associated with said reference storage device, read-out means for inducing read-out signals on said information and reference sensing conductors representative of the operative state of each of said information and reference storage devices, respectively, a pulse generator operated responsive to a read-out signal on said reference sensing conductor for generating a signal, and gating means operated responsive only to the coincidence of said signal and said read-out signal on said information sensing conductor for generating output signals indicative of said operative states of said information storage devices.

19. An information storage matrix comprising a plurality of information magnetic storage elements, a reference magnetic storage element, each of said information and reference storage elements being capable of assuming stable remanent states representative of particular information values, an information sensing conductor coupled to said information storage element and energizable responsive to the switching of said last-mentioned element from a particular remanent state to another for providing information read-out signals, a reference sensing conductor coupled to said reference storage element and energizable responsive to the switching of said last-mentioned element from said particular remanent state to said other state for providing a reference read-out signal, a pulse generator energized responsive to said reference read-out signal for generating a signal, gating means associated with said information sensing conductor, and circuit means for applying said signal to said gating means, said gating means being responsive only to the coincidence of said signal and said information read-out signals on said information sensing conductor to provide output signals indicative of said particular remanent state of said information storage element.

20. An information storage matrix according to claim 19 in which said gating means comprises amplifying means.

21. An information storage matrix comprising an information plane and a reference plane, each of said planes comprising a coordinate array of corresponding magnetic storage elements, each of said elements being capable of assuming stable remanent states representative of particular information values, a reference sensing conductor serially inductively coupled to the storage elements of the coordinate array of said reference plane, an information sensing conductor serially inductively coupled to the storage elements of the coordinate array of said information plane, said reference and sensing conductors having read-out signals induced thereon responsive to the switching of particular elements in each of said reference and information planes from a particular remanent state to another, a pulse generator energized responsive to a read-out signal on said reference sensing conductor for generating a signal, gating means having a pair of inputs, and means for connecting said pulse generator to one input of said gating means, the other input of said gating means being connected to said sensing conductor, said gating means being enabled by the coincidence of said pulse and read-out signals on said connected information sensing conductor to provide output signals indicative of said particular remanent states of said particular storage element.

22. An information storage matrix according to claim 21 in which said gating means comprises an amplifier means.

23. An information storage matrix according to claim 21 in which each of the magnetic storage elements of said coordinate arrays of said reference and information plane comprises a toroidal magnetic core.

24. An information storage arrangement comprising a plurality of magnetic storage elements including a reference storage element, each of said elements being capable of storing a first and a second binary value in the form of one or the other stable remanent state, said reference element having a first binary value stored therein, a sensing conductor inductively coupled to each element of said plurality of storage elements, read-out means for simultaneously switching the remanent state of each of said elements having said first binary value stored therein to thereby induce read-out signals in said coupled sensing conductor, a pulse generator connected to the sensing conductor coupled to said reference storage element energized responsive to the read-out signal induced in said last-mentioned conductor for generating a signal, amplifier means associated with said sensing conductor except the sensing conductor coupled to said reference storage element, and means for energizing said amplifier means comprising circuit means for applying said signal to one control input of said amplifier and means for applying said read-out signal induced in the sensing conductor coupled to said switching elements of said plurality of elements to another control input of said amplifier means.

25. In combination, a memory matrix means for storing one character of a plurality of information words, each word comprising a predetermined combination of binary characters, said matrix means having an information sensing conductor associated with an information character address of each of said words, said information sensing conductor being energized during the read-out of a particular word from said matrix means to provide information read-out signals when the associated character address of said particular word contains a particular one of said binary characters, a reference information address means containing said particular one of said binary characters, a reference sensing conductor associated with said reference address means energized during said read-out of said particular word to provide a reference read-out signal, a pulse generator energized responsive to said reference read-out signal for generating a signal, gating means connected to said information sensing conductor, and means for enabling said gating means comprising circuit means for applying said signal to said gating means.

26. The combination as claimed in claim 25 in which said gating means comprises an amplifier means energized responsive to the coincidence of said signal and an information read-out signal indicative of said particular one of said binary characters.

27. In combination, a memory matrix means for storing binary "1's" and "0's" arranged in information words, said matrix means having an information sensing conductor energized during read-out to provide information read-out signals representative of the binary "1's" of a particular word, a reference matrix for storing a binary "1" for each word of said memory matrix means, said reference matrix having a reference sensing conductor energized during said read-out to provide a reference read-out signal, a pulse generator energized responsive to said reference read-out signal for generating a signal, an amplifier-gating means connected to said information sensing conductor and to said generator, said amplifier-gating means energized responsive to the coincidence of said signal and said information read-out signals to provide output signal conditions indicative of the binary "1's" and "0's" of said particular word.

28. The combination as claimed in claim 27 in which said memory matrix means comprises coordinate arrays of toroidal magnetic cores, each being capable of storing a binary value in one or the other state of remanent magnetization.

29. The combination as claimed in claim 28 in which said reference matrix also comprises a coordinate array of said toroidal magnetic cores.

30. An information storage arrangement comprising memory means having a first information storage element at a first information address therein and a second information storage element at a second information address therein, an information sensing conductor serially associated with each of said information addresses, and means for sampling read-out signals appearing on an output end of said information sensing conductor originating at said first information address at a first time and originating at said second information address at a second time comprising a first reference storage element at a first reference address corresponding to said first information address and a second reference storage element at a second reference address corresponding to said second information address, each of said reference storage elements having a particular binary value stored therein, a reference sensing conductor serially associated with each of said reference addresses, said reference sensing conductor being energized during read-out at said first time and at said second time to provide a reference read-out signal at each of said times indicative of said particular binary values, a pulse generator energized responsive to said reference read-out signals for generating a signal at each of said times, and gating means connected to the output end of said information sensing conductor enabled responsive to said signal for gating only read-out signals representative of said particular binary value.

31. An information storage arrangement comprising a memory matrix for storing a plurality of binary words, each of said words including a reference bit and a plurality of information bits, said reference bit being a binary "1", an information sensing conductor for sensing information bits of said words, a reference sensing conductor for sensing corresponding reference bits of said words, read-out means for simultaneously inducing read-out signals on said reference and information sensing conductor representative of binary "1's" of a selected word of said matrix, a signal generator energized responsive to the read-out signal on said reference sensing conductor for generating a signal, amplifier-gating means connected to said information sensing conductor, and circuit means for applying said signal to said amplifier-gating means, said amplifier-gating means being energizable responsive to the coincident application of said signal and a read-out signal representative of a binary "1" on the connected information sensing conductor for generating an amplified output signal also representative of said last-mentioned binary "1".

32. A magnetic memory matrix comprising information word storage means comprising a plurality of magnetic means for storing a plurality of information bits and a reference bit in the form of a particular remanent flux state, a plurality of sensing conductor means associated with the magnetic means of said word storage means, means for simultaneously switching particular remanent flux states in said word storage means to generate an information read-out signal and a reference read-out signal on said sensing conductor means, means responsive to said reference read-out signal for producing a signal, and means responsive to said signal for sampling said information read-out signal.

* * * * *

UNITED STATES PATENT OFFICE
CERTIFICATE OF CORRECTION

Patent No. 3,670,314 Dated June 13, 1972

Inventor(s) Lawrence A. Tate

It is certified that error appears in the above-identified patent and that said Letters Patent are hereby corrected as shown below:

Delete Claim 17.

Signed and sealed this 9th day of January 1973.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334.